No. 12,723. REISSUED NOV. 19, 1907.

A. C. E. RATEAU.

PUMPING APPARATUS.

APPLICATION FILED JULY 20, 1906.

3 SHEETS—SHEET 1.

Witnesses:
Alfred H. Moore.
Irving Mac Donald.

Inventor:
Auguste C. E. Rateau,
By Barton, Hunter & Fox
Att'ys.

No. 12,723. REISSUED NOV. 19, 1907.
A. C. E. RATEAU.
PUMPING APPARATUS.
APPLICATION FILED JULY 20, 1906.
3 SHEETS—SHEET 2.
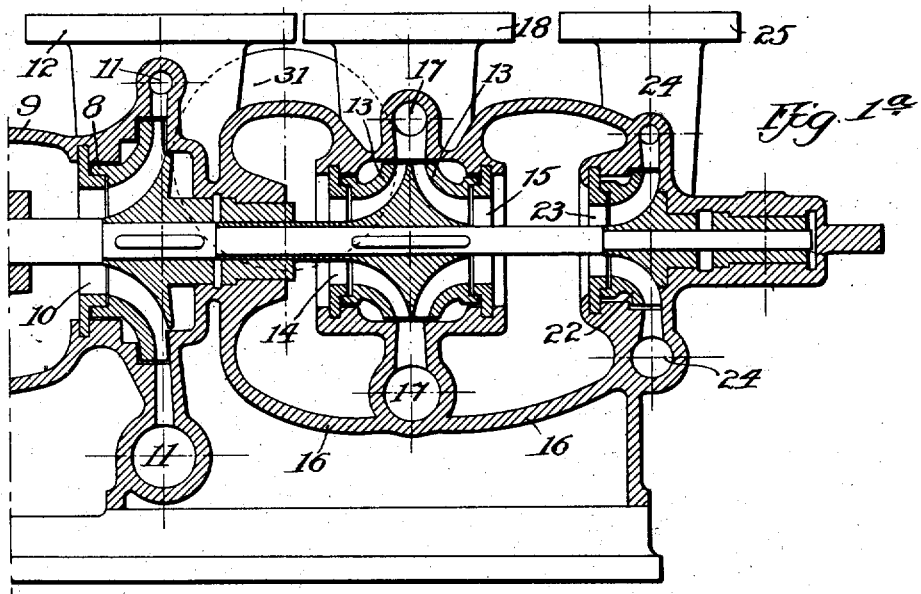
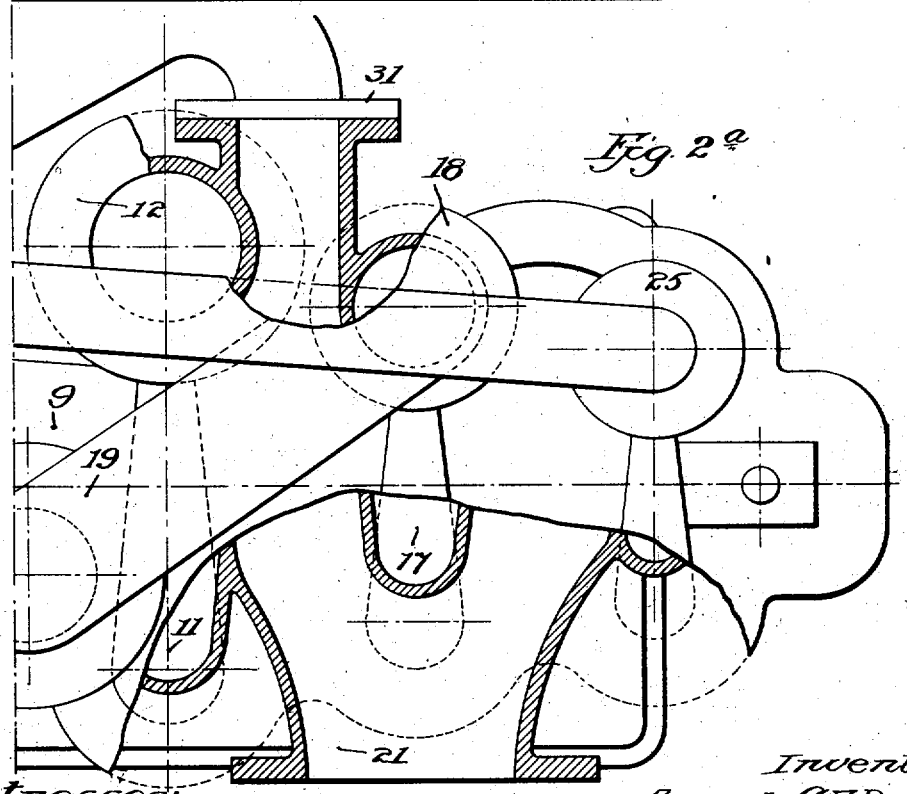
Witnesses:
Alfred H. Moore.
Irving MacDonald
Inventor:
Auguste C.E. Rateau,
By Burton Mauner & Fox
Attys.

No. 12,723. REISSUED NOV. 19, 1907.

A. C. E. RATEAU.

PUMPING APPARATUS.

APPLICATION FILED JULY 20, 1906.

3 SHEETS—SHEET 3.

Witnesses:

Alfred H. Moore.

Irving Mac Donald.

Inventor:

Auguste C. E. Rateau,

By Burton Turner & Fick

Attys.

UNITED STATES PATENT OFFICE.

AUGUSTE CAMILLE EDMOND RATEAU, OF PARIS, FRANCE, ASSIGNOR TO RATEAU TURBINE COMPANY, OF CHICAGO, ILLINOIS, A CORPORATION OF WEST VIRGINIA.

PUMPING APPARATUS.

No. 12,723. Specification of Reissued Letters Patent. Reissued Nov. 19, 1907.

Original application filed December 15, 1902, Serial No. 135,191. Divided and this application filed May 26, 1903. Serial No. 158,791. Original No. 765,994, dated July 26, 1904. Application for reissue filed July 20, 1906. Serial No. 327,099.

Be it known that I, AUGUSTE CAMILLE EDMOND RATEAU, a citizen of the Republic of France, residing in Paris, France, have invented certain new and useful Improvements in Pumping Apparatus, of which the following is a specification.

This invention relates in general to pumping apparatus, and more particularly to means for governing such apparatus.

In the case of centrifugal pumps delivering fluid through a pipe, it is evident that the quantity of fluid delivered in a given time will depend upon the velocity of flow, which in turn will depend upon the speed of the centrifugal impeller; and the dynamic pressure of force of impact of the fluid acted upon by such impeller will vary as the square of the velocity, being due to its momentum as distinguished from mere static pressure. I propose, therefore, to govern the motor which drives the fluid-impelling apparatus by means of a suitable movable controlling part, such as a diaphragm, which is subjected to pressure produced by the impact of the fluid acted upon, so that the apparatus will be very sensitive to slight changes in the speed of the fluid or of the centrifugal impeller acting on such fluid, as the case may be, making possible a very close regulation. For example, to maintain the delivery of fluid through a pipe constant in volume, I make use of a Pitot tube with its open end facing the fluid current, and connect the Pitot tube with the governing apparatus of the motor to apply the pressure thus received to the controlling diaphragm.

In the accompanying drawings, I have illustrated the application of my improved governor mechanism to a centrifugal pump such as described in my Patent No. 768,076, granted August 23rd, 1904, of which the present case is a division.

Figure 1:
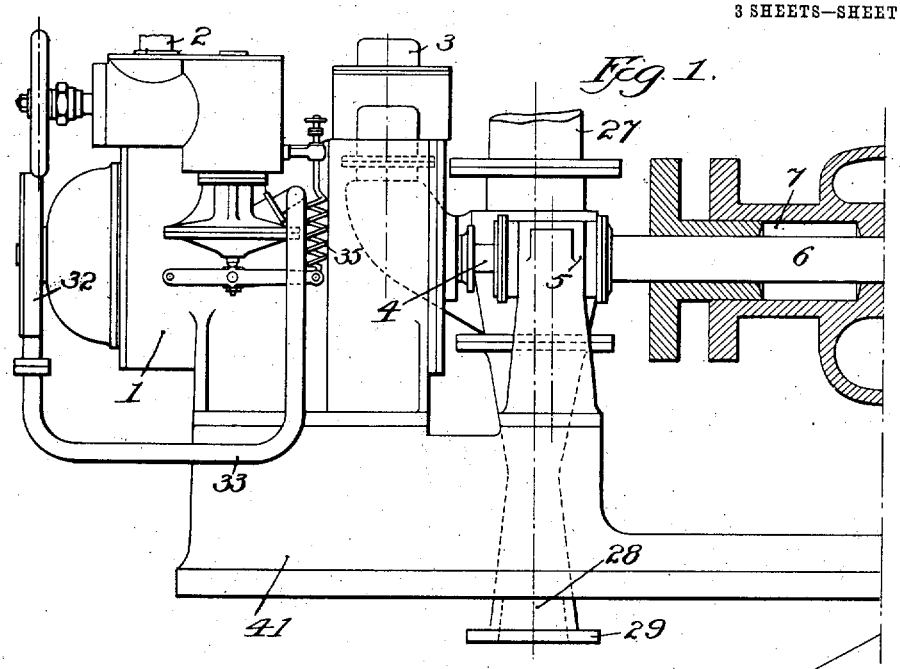
Figure 2:
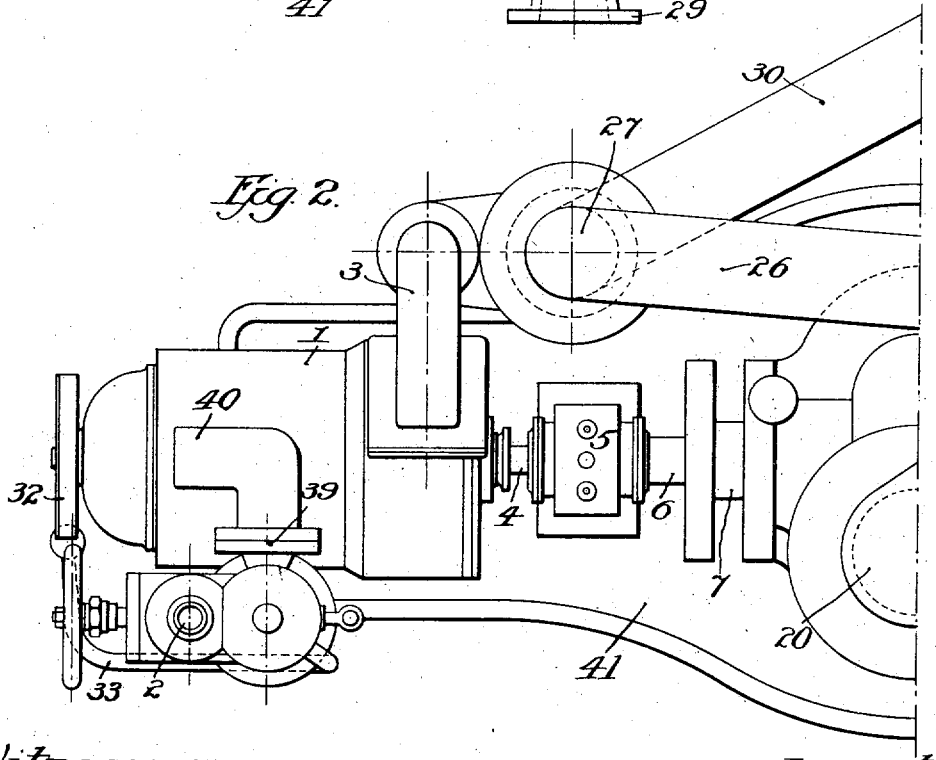
Figure 3:
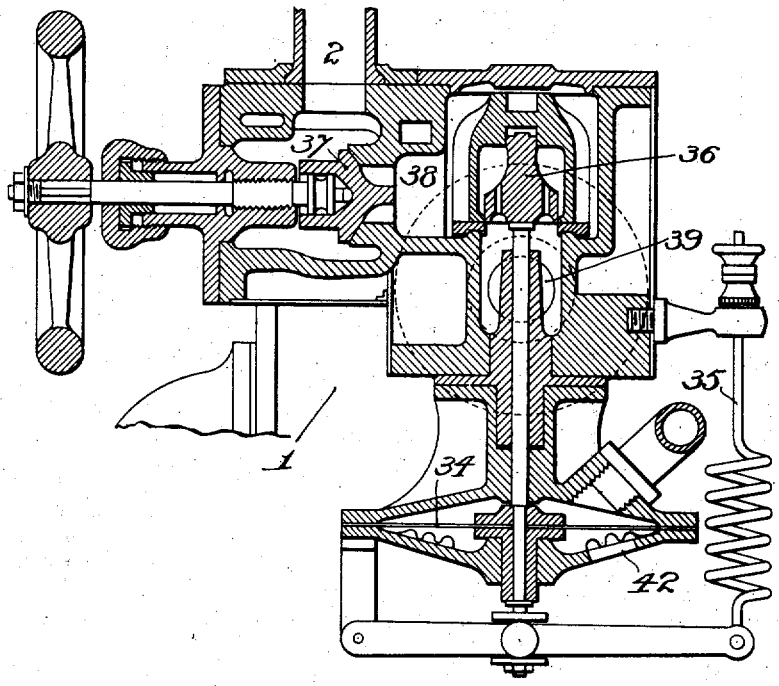
Figure 4:
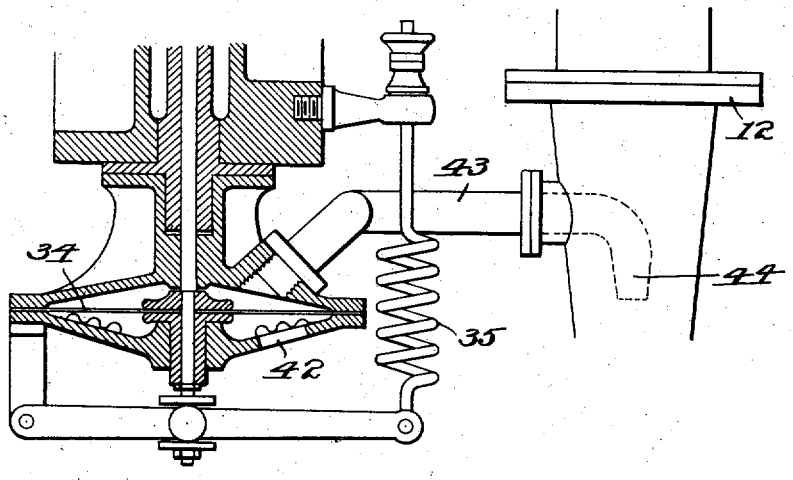

Figures 1 and 1[a] are partial longitudinal sectional views of the pumping apparatus including the improved governor mechanism of this invention; Figs. 2 and 2[a] are plan views; Fig. 3 is a sectional view on a larger scale, showing the obturator for controlling the inlet of steam to the turbine; and Fig. 4 is a view also on a larger scale, showing the arrangement for governing the obturator by means of the dynamic pressure or impact of the fluid in the delivery pipe.

Referring to the drawings, 1 is the turbine, provided with one or more moving wheels.

2 is the inlet for the steam which passes into the obturator, which will be mentioned later.

3 is the exhaust-outlet, the steam passing into the ejecto-condenser.

4 is the turbine-shaft extending beyond the casing.

5 is the bearing for the shaft.

6 is the shaft beyond the bearing upon which the pumps are mounted.

7 is the stuffing-box of the pump-inlet.

8 is the propeller of the main pump.

9 is the casing into which the water passes on its way to the port of the propeller 8.

10 is the port of the inlet of the propeller 8.

11 is the delivery-chamber receiving water at the outlet from the propeller 8.

12 is the flange of the outlet-pipe of the delivery-chamber.

13 13 represent the propeller of the feed-pump, provided with two sets of ports.

14 and 15 are the ports of the propeller 13 13.

16 is the casing containing the water passing to the ports 14 and 15 of the feed-pump.

17 is the delivery chamber which receives the water at the outlet from the propeller 13 13.

18 is the flange of the pipe leading from the delivery-chamber 17.

19 is the pipe conveying the water passing from the feed-pump to the main pump.

20 is the inlet-pipe for the water into the interior of the casing 9 of the main pump.

21 is the inlet suction-orifice of the feed-pump which draws water into the casing 16.

22 is the propeller of the pump intended to supply the ejecto-condenser.

23 is the port of the pump feeding the ejecto-condenser and which contains its water-supply from the casing 16.

24 is the delivery chamber receiving water at the outlet from the propeller 22.

25 is the flange of the pipe from the delivery-chamber 24.

26 is the delivery-pipe of the pump feeding the ejecto-condenser and leading to the suction-pipe of the ejecto-condenser.

27 is the inlet pipe into the ejecto-condenser.

28 is the ejecto-condenser.

29 is the outlet-orifice for the water of condensation from the ejecto-condenser.

30 is the pipe leading the water at the outlet from the ejecto-condenser into the casing 16 of the feed-pump.

31 is the flange of the inlet-pipe for the water from the ejecto-condenser into the casing 16.

32 is the centrifugal fan keyed to the end of the shaft of the steam-turbine.

33 is the delivery tube for the air coming from the fan 32 and passing into the apparatus governing the speed.

34 is a flexible membrane governing the obturator-rod placed at the steam-inlet.

35 is a counter-spring for regulating the flexible membrane 34.

36 is the obturator provided with passages placed at the steam-inlet.

37 is a valve governed by a hand-wheel which can interrupt communication with the steam-inlet tube 2.

38 is the casing containing the steam-obturator.

39 is the outlet orifice for the steam after passing through the obturator.

40 is the pipe leading the steam into the turbine after its passage through the obturator.

41 is a frame common both to the turbine and to the pumps.

42 is the orifice putting the flexible membrane into communication with the outer air.

43, Fig. 4, is a Pitot tube connecting together the upper portion of the casing inclosing the flexible membrane 34 and the main delivery-pipe 12 of the pump.

44 is the end of the Pitot tube 43 passing into the pump-delivery and having its open end facing the stream of fluid.

In the operation of the apparatus, the turbine is driven by means of steam passing through the inlet-pipe 2. The pipe 2 is directly closed by means of a needle-valve 37, actuated by a hand-wheel. As soon as the said valve is open, steam passes through an obturator provided with passages. The method of governing said obturator will be explained later. It then passes to the steam-turbine, expands in the different wheels composing it, (the turbine may, however, if desired, be composed of a single moving wheel,) and at its outlet from the turbine passes through the connecting-pipe 3, which leads to the ejecto-condenser. The turbine-shaft after having traversed the bearing 5 passes directly to the pumps. The propeller 8 of the main pump sucks water from the casing 9 and forces it into the delivery chamber 11. The water which fills the casing 9 is derived from the two-passage feed-pump 13 13. It is the said second pump which takes water directly through the suction-orifice 21 from the reservoir containing the water. The two-passage pump 13 13 is capable of sucking at a distance of several meters. It forces the liquid under a differing head, dependent upon the dimensions of the pump 8. It is almost entirely upon the latter pump that the height to which the water is pumped depends. The water from the two-passage pump 13 13 is collected by the delivery-chamber 17 and passes out through the flange 18 and through the pipe 19 into the suction-pipe 20 of the main pump. At its passage out of the main pump the water passes into the delivery-column through the pipe 12. If desired, the outlet to the condenser may adjoin the steam-turbine. For this object the turbine is provided with an ejecto-condenser 28, which is fed under pressure by a small centrifugal pump 22, placed at the end of the shaft. The said centrifugal pump takes water from the portion of the suction-chamber 16 which feeds the passages 15 of the feed-pump. The water which passes out from the small centrifugal pump through the delivery chamber 24 and the pipe provided with the flange 25 passes through the pipe 26 into the ejecto-condenser. The water causes the steam passing out from the turbine to be condensed and the whole of the steam and the water of condensation returns through the pipe 30 and the pipe provided with the flange 31 into that portion of the sucking-chamber 16 which feeds the pump-port 14 of the feed-pump. It will be seen that in this arrangement a fraction of the suction water serves for the condensation. The water is derived from the main circuit of the liquid passing from the suction-orifice 21 to the last delivery-pipe provided with the flange 12. The advantage of this arrangement consists in allowing the condensation of the steam of the turbine to greatly increase its useful effect by means of a small supplementary expenditure of mechanical work.

Mounting the three pumps upon the same shaft, which is directly driven by a steam turbine, allows a compact and efficient assemblage to be formed. The centrifugal pumps may be made to profit by the great speeds which steam-turbines allow of, and thus consequently obtain great elevations which have not hitherto been possible to obtain with this class of apparatus.

The speed of the turbine or other motor driving the pump may be regulated according to two different plans. As shown in Fig. 3, the steam passing to the turbine is controlled by an obturator 36 which, in the form of mechanism shown, is arranged to be operated by means of a flexible membrane 34 which is connected to the obturator by a rod. This membrane is inclosed in a suitable casing and is adapted to be subjected to fluid pressure conveyed to the inside of said casing by a tube 43; the pressure exerted upon the membrane by the fluid being opposed, in the present instance, by an adjustable counter-spring 35. The turbine is shown as driving two distinct fluid-impelling devices, namely, the main centrifugal pump for pumping water, and a centrifugal fan 32; and the dynamic pressure of the fluid acted upon by either of these devices may be conveyed through the pipe 43 or 33 to act upon the membrane 34 and effect the governing. In the case where the delivery from the fan is made the basis of governing, a constant speed of the turbine may be maintained irrespective of the delivery from the water-pump. Thus upon an increase in speed, the dynamic pressure of the fluid acted upon by the fan would increase as the square of the speed, and acting upon the membrane 34, would draw down the obturator and tend to strangle the steam-inlet orifice; while upon a decrease in speed, the mechanism would act oppositely to admit more steam to the turbine. On the other hand, a constant delivery of fluid from the main pump may be secured by arranging the pipe 43 to communicate with the delivery passage of the main pump, ending in an open tube 44 whose mouth faces the stream of fluid flowing through said passage. Such a tube is known as a Pitot tube, and in this case conveys a pressure which is equal to the static pressure plus the dynamic pressure or pressure due to the momentum of the fluid. In this case the pressure upon the membrane 34 will, therefore, vary approximately as the square of the velocity of the fluid current delivered by the main pump, making a very sensitive governor which will vary the speed of the motor to cause the pump to deliver a constant volume of fluid.

I have shown an arrangement in which the membrane or movable controlling part is acted upon by the pressure from the pipe 33 or 43 upon one side, while the opposite side thereof is subjected to the pressure of the external air; but it is evident that the principles of governing herein set forth may be embodied in apparatus of different form; the essential feature being broadly the utilization of dynamic pressure due to impact or momentum of the fluid as the basis for governing the impeller acting upon such fluid.

I claim:—

1. In a pumping apparatus of the character described, a steam-turbine and its shaft, and a main centrifugal pump located on and operated by the turbine-shaft, in combination with an obturator interposed in the steam-inlet of the turbine, and means controlled by the velocity of the discharge from the main pump for governing said obturator.

2. In a pumping apparatus of the character described, a steam-turbine and its shaft, a main centrifugal pump located on and driven by said shaft, a delivery-pipe into which said pump discharges, an obturator interposed in the steam-inlet, a flexible membrane in operative connection with said obturator, one face of said membrane being in communication with the external atmosphere, and a Pitot tube extending from above the other face of said membrane into the delivery-pipe from the main pump and arranged to convey varying-pressures in said delivery-pipe to the membrane, whereby the governing of the obturator is controlled by the discharge from the main pump.

3. In a pumping apparatus of the character described, a steam turbine and its shaft, and a centrifugal fluid-impeller located on and operated by the turbine-shaft, in combination with an obturator interposed in the steam-inlet of the turbine and means controlled by the momentum of the fluid current acted upon by the said impeller for governing said obturator.

4. The combination with a fluid-impelling apparatus and a motor connected to drive the same, of a governor apparatus for said motor, having a movable controlling part, and means for subjecting said controlling part to pressure varying with the momentum of the fluid current, whereby the speed of said motor is regulated according to the variations in such pressure.

5. The combination with a centrifugal fluid impeller, of a motor connected to drive said impeller, a governor for said motor having a controlling part adapted to be acted on by fluid pressure, and a Pitot tube connected to subject said controlling part to varying pressures produced by the impact of the moving current of fluid, whereby said motor is governed according to changes in the velocity of said fluid discharge.

6. The combination with a fluid impelling apparatus and a motor connected to drive the same, a governor apparatus for said motor, and means controlled by the velocity of the fluid current delivered by said impelling apparatus for operating said governor apparatus.

AUGUSTE CAMILLE EDMOND RATEAU.

Witnesses:
HANSON C. COXE,
JACK BAKER.